April 11, 1967     K. B. JEFFERTS ETAL     3,313,301
INSTRUMENT TO IMPLANT TAGS IN MACRO-ORGANISMS
Original Filed Jan. 2, 1963

INVENTORS
KEITH B. JEFFERTS
PETER K. BERGMAN
BY Ernest S. Cohen
Gersten Sadowsky
ATTORNEYS

# United States Patent Office 3,313,301
Patented Apr. 11, 1967

3,313,301
INSTRUMENT TO IMPLANT TAGS IN MACRO-ORGANISMS
Keith B. Jefferts and Peter K. Bergman, Seattle, Wash., assignors to the United States of America as represented by the Secretary of the Interior
Original application Jan. 2, 1963, Ser. No. 249,103, now Patent No. 3,128,744, dated Apr. 14, 1964. Divided and this application Jan. 16, 1964, Ser. No. 345,058
2 Claims. (Cl. 128—330)

The invention herein described and claimed may be manufactured and used by or for the Government of the United States of America for governmental purposes without the payment of royalties thereon or therefor.

This is a division of application Ser. No. 249,103, filed Jan. 2, 1963, and now Patent No. 3,128,744.

This invention relates to a method and means having utility therein, for investigating the migration and related physiological characteristics of macro-organisms existing individually or in groups. More particularly, the invention concerns a procedure wherein fish are tagged internally with small particles carrying identification and information marks, and released in their normal environment, whereby a subsequent recovery of these fish with their tags, makes available data relevant to the aforementioned investigations. The novel instrument facilitating the procedure of the invention, comprises a particle implanter having associated therewith a specially formed enclosure structure in which a fish is maintained in position to receive the particle at a suitable location therein. By use of this unique means, deleterious injury to the fish is avoided, and the possibility of loss of the particle before it is detected and recovered from the fish, is substantially eliminated.

The method of the present invention is in many ways superior to marking or tagging procedure now in use for obtaining information on fish migration. It is particularly suited for tagging relatively young, small fish, or fingerlings, which constitute the class of fish most frequently used in initiating migration studies. Almost exclusively used at present for marking small fish is fin clipping or removal. A most serious drawback inherent in such methods is the occurrence of regeneration of the clipped portions, which combined with the presence of natural marks on the fish under study, often makes identification very unreliable. Mortality losses due to the injury of excision, or the loss of the use of the fin or fins, or both, tend to confuse the significance of data obtained by such methods. Another disadvantage is the human factor in the recovery of fish marked by fin clipping, in that voluntary recoveries by fishermen are almost valueless to a statistically valid sampling program, and in fact often have an adverse effect by eliminating marks which might otherwise be taken in a random sampling. Confusion using such methods also occurs as a result of duplication of fin clipped fish used in separate but concurrent studies made in the same geographic area.

Other prior fish tagging methods involved attaching external plastic or metal pieces on the outside of the fish. This has been found unsatisfactory in many respects since the tags used were all of relatively large size to facilitate visual recovery, and could not therefore be placed on small fish. Such tags being prominently visible on the outside of the fish are liable to be taken and withheld by fishermen in an effort to influence the results of a survey. Natural causes such as water currents, also act to cause the loss of tags exposed outside the fish.

The present invention proposes to tag fish with extremely small tags which can be conveniently and safely placed in the body substance of the fish, where the tags are not visible or likely to be lost. Such tags can be made of metal or other materials subject to detection by electrical means, and susceptible to being marked with information bits. Recovery of the tags is therefore easily accomplished by the use of magnetic or electrical impedance detection means when the fish are caught and brought to a processing point. Previous attempts to use internal tags fared poorly in that these tags were large in relation to fish size, and awkward and injurious to apply. Moreover, since such tags were invariably placed in the body cavities of the fish as in the manner described in Patent No. 2,121,787, issued on June 28, 1938, to E. H. Dahlgren, they were very often lost with the viscera of fish being cleaned in transit to the processing point.

An object of the present invention therefore is to provide an improved method for identifying living creatures in a study of their habits when existing in a natural environment.

Another object of the present invention is to provide an improved method for researching the characteristic habits of living creatures by the application of identifying procedures which tag the creatures internally.

A further object of the present invention is to provide a method for identifying fish in connection with an examination of their natural migration patterns, by utilizing electrical and magnetic devices.

A still further object of the present invention is to provide a method for deriving data indicative of the movements of fish, employing specially marked tags placed within the fish.

A yet still further object of the present invention is to provide an instrument for facilitating the proper emplacement of tags within the fish.

These and other objects and advantages of the invention will be more clearly understood from the following description of a preferred embodiment of the invention, considered together with the accompanying drawings wherein.

Figure 1:
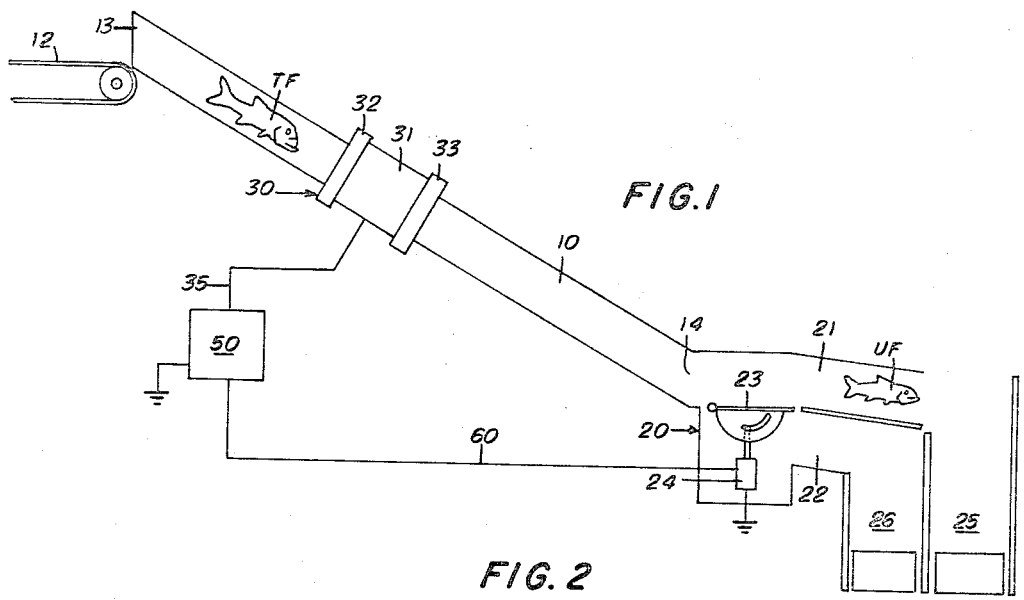
FIG. 1 is a schematic diagram of a system having utility in the method of the invention, for detecting tagged fish and separating them from untagged fish.

A preferred form of the improved organism identification and migration study procedure according to the instant invention, which pertains to an examination of the habits of fish, requires that each one of a great number of fish be marked within its body with a tiny metal tag. Areas near the back and head of a fish were found most suitable for receiving a tag of this nature. By tagging the fish in the head, subdermally in cartilage forward of the brain, or in the muscle tissue of the back, subsequent shedding of tags by the fish is reduced to an insignificant minimum. Making the tags of corrosive resistant materials is advantageous since deteriorated or rusting tags are likely to work loose, and slip out of the fish. Reducing the tag dimensions is also an effective way of avoiding possible loss of emplaced tags. An exemplary form for a tag suitable for use in fingerlings measuring two to four and one-half inches in total length, is a type 302 stainless steel rod 0.010 inch in diameter, and 0.040 inch in length. Tags of this rod material have excellent magnetic characteristics, whereby they may be magnetically coded for a purpose to be hereinafter more fully explained.

Placing the tags as hereinbefore described, is not particularly injurious to the fish. Fish tagged in this manner showed no bodily inflammation, remaining vigorous and increasing their length and weight normally over a significant period of time. Consequently, after a specified number have been tagged, they can be confidently returned to their natural environment in a river or stream, for detection at a later time. Recovery of such tagged fish depends largely upon the cooperation of commercial fishermen and the processing plants receiving their catch. Information obtained from these sources supplies the requisite background data for the migration study of tagged fish recovered from a catch. Tags removed from the fish supply the primary data by means of coded intelligence with which the tag had been previously marked.

Magnetic coding embodying the principles of wire recording, allows each tag to carry a large number of information bits. It is possible by such means to provide each tag with an individual number. However, recording in this manner requires each tag to be separately marked, entailing much additional handling of the extremely small tags. A more convenient expedient is a color coding of tags. This is best done by applying to nearly the full length of a roll of fine wire, continuous, longitudinal stripes of variously colored epoxy paints. Stainless steel wire 0.01 inch in diameter could have applied to it up to six side-by-side stripes, each of which may be any one of ten colors, such as provided by the standard RETMA colors. Using two stripes of different width to denote the starting point, and direction of reading, there are $10^6$ color combinations in six stripes, or a million different combinations. It is evident that by providing a few additional longitudinal stripes to a wire, the number of possible code identifications may be substantially increased. Application of the different colored stripes may be accomplished manually with the aid of optical enlarging and projecting apparatus. Automatic means for this purpose is also available. After the fine wire is color striped as prescribed, it is cut to desired tag lengths so that all tags produced from a particular length of wire, are identical. For this reason a color coding system is best suited for tagging groups of fish wherein individual identification of the fish is not desirable.

Placing a coded tag within the fish may be accomplished by various manual, or semi-automatic means, including the use of hypodermic type injectors such as disclosed in Patent No. 2,751,907, issued on June 26, 1956, to G. M. Hickey, and Patent No. 2,907,327, issued Oct. 6, 1959, to E. A. White. It is obvious that a tag other than one made from precut wire may be implanted in the fish by such means. Plastic coated carbon steel tags of square cross-section, or in other shapes, would also provide suitable means to carry the coded intelligence. Stainless steels such as type 304, or even non-metallic, non-corrosive magnetic materials such as ceramic magnets could be used as the tag material. Color coding the basic tag material may be accomplished using any one of the numerous available relatively inert colorable plastic materials such as polyurethane, polyvinyl chloride, although epoxy is recommended because of its optimal adhesion characteristics.

Figure 2:
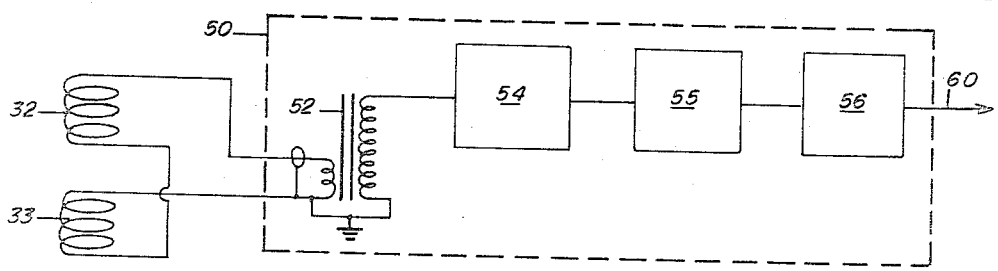
FIG. 2 is another schematic diagram showing the several electronic components comprising an operational control arrangement for use in connection with the system of FIG. 1.

Segregation of the tagged fish from the mass of fish accumulated in a commercial catch comprising mainly adult fish, is accomplished with apparatus such as shown schematically in FIGS. 1 and 2. Provided therein is a relatively short chute 10, of substantial width, made of non-magnetic material, which is inclined downwardly from a conveying platform 12, on which the catch of fish is received. The chute's upper end opening 13, is adjacent the discharge end of the conveyor 12, whereas its lower end opening 14, merges into a channel directing the fish into a deflector mechanism 20. Two separate output channels 21 and 22 of this mechanism are adapted to be selectively fed with the fish moving through chute 10. For this purpose a deflector gate 23, pivotally supported in mechanism 20, is flexibly connected to and made operative by a normally extended plunger of a solenoid 24.

As shown in FIG. 1, the gate 23 is normally maintained to direct untagged fish UF received at the input channel, out through the channel 21, and into a receiving trough and conveyor 25. Causing gate solenoid 24 to energize when a tagged fish TF is passing through the chute, effects the retraction of the solenoid plunger which draws the gate 23, connected thereto, to a pivoted position whereby it provides a path directing the fish TF then being received at the input channel, out through the channel 22 and into trough and conveyor means 26. Following deenergization of the solenoid 24, its plunger is released to extend outwardly therefrom, whereby gate 23 is repositioned to direct fish UF out through channel 21.

Gate mechanism 20 is made operative by the signal output of a detection apparatus comprising a sensing head 30, providing a control input to a detector circuit 50. An exemplary construction for a sensing head comprises a relatively short section of pipe 31, of non-magnetic material such as aluminum, having a diameter sufficiently large to allow it to fit about the chute 10, as indicated in FIG. 1. Encircling the outside of pipe 31, adjacent each of the opposite openings therein, are fixed a set of spaced windings 32 and 33. Comprising the individual windings of the exemplary form, are 350 turns of #18 copper wire, creating a coil which is covered all around by an aluminum housing so as to form a complete electrostatic shield for each coil. As best illustrated in FIG. 2, coils 32 and 33 are connected in series but each is wound to produce a magnetic field equal and opposite to the field produced by the other, such that a direct current through both produces zero net magnetic field at the geometric center of the coil assembly on the pipe 31.

Sensing head 30 is made effective when a small voltage induced therein by the passage therethrough of a permanent magnet, in particular the tiny steel particle in a tagged fish, is supplied on lead 35 to the detector circuit 50. The major components of this circuitry is shown in FIG. 2 to include a sensitive input transformer 52, a high gain, low frequency amplifier system including a preamplifier 54, and a transistor amplifier 55, supplying an output to trip a Schmitt trigger circuit 56. The circuit components of detector 50 are each conventional electronic devices, and they are arranged therein to cooperate in a well-known manner to produce an operational impulse from the trigger 56 in response to the voltage input from the sensing head 30 to transformer 52. Solenoid 24 is activated as hereinbefore described, when its coil receives the trigger output on a lead 60 connecting the detector circuit to the solenoid. It is evident that sensing head 30 is suitably spaced from the deflector mechanism 20, to allow gate 23 when actuated by solenoid operation, to be appropriately aligned with channel 22, so that it properly guides the tagged fish initiating the solenoid energizing impulse, into trough 26. Conversely, this spacing is appropriate to allow gate 23 to release directly thereafter in sufficient time to complete a path into channel 21 when the following fish is untagged. Also apparent is that there exists some minimum velocity at which any particular form of tag travelling through the sensing head is detectable. Factors to be considered in this connection are tag size, its magnetic quality, the quality and in particularly the noise figure of the amplifier, and the magnetic purity of the environment in which the sensing head operates. An exemplary relationship of this nature would allow a tag having a magnetic moment of $5 \times 10^{-11}$ weber-meter, to travel at about 10 feet per second through the sensing head. Other similar forms of gating means are available for segregating fish in the manner hereinbefore described, an example of which is found in the aforementioned patent to Dahlgren.

Among other sensing devices available to achieve tag detection is a flux-gate magnetometer of the type manufactured by Hewlett-Packard Company of Palo Alto, Calif., which is used with their #428B clip-on milliammeter. Use of such a device would require only the addition of an accessory trigger to receive the magnetometer output, to accomplish the previously described selection of the tagged fish from the mass of the catch. Also available for use as sensing means are the optically pumped atomic magnetometers manufactured by Texas Instruments Inc. and Varian Associates. With such systems the detection range could be extended to about six feet using the 0.010 inch by 0.040 inch size tages previously described. On the other hand, the tag size may be reduced by a large factor within somewhat lesser requirements of detection range. By merely instrumenting the receiving chute on both side, the equipment of this sensitivity would allow detecting and counting to tagged fish passing through a channel as wide as twelve feet. Sensitivity for any of the detectors used is increased by applying a tag magnetizer to the fish before they are received by these detectors. One simple form of magnetizer comprises a non-magnetic tube or chute placed in a region of high magnetic field produced by either an electromagnet or a permanent magnet, wherein tagged fish passing through the chute direct the tag parallel to the magnet field.

Figure 3:
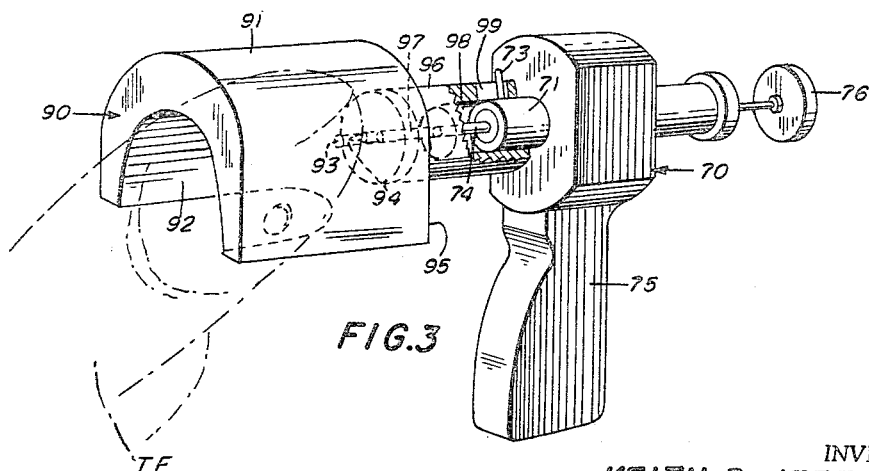
FIG. 3 is a perspective view partly in section, of an assembled tag inserting instrument according to a further aspect of the invention, having particular utility in practicing the method of the invention.

An instrument as shown in FIG. 3 is advantageously utilized to expidite the tagging in accordance with the method of the present invention, of a large number of fish whose sizes fall within a substantially small range. This instrument uniquely combines with a tag implanter structure 70, an indexing, or gauging housing 90, in which the fish is maintained in a predetermined position to receive the tag at a proper locale therein. Basically, housing 90 is formed by a partial cylindrical mold 91, of Lucite or other similar transparent plastic, having a large cavity 92 opening at its bottom and through one end thereof, which is specially contoured to receive therein the top of the head and upper jaw of the fish. As shown in FIG. 3 by the dot and dash outline within the cavity 92, the fish is brought into position to place the cartilage of its head forward of the brain, in line with an opening 93 at the end of a small bore conduit 94 passing through the end wall 95 of the cavity.

Into a cylindrical depression of the end wall 95, is tightly fitted or screwed, the forward end of an adapter or connector element 96. A further small bore conduit 97 passing centrally through this adapter, is aligned with the housing conduit 94, and opens into a relatively wide cylindrical aperture 98 extending about mid-way into the adapter 96, from an opening at the rear end thereof. Implanter 70 is provided with a short cylindrical band 71, fixed to its forward clamping collar or ring, by a pin 73 which extends outwardly, normal to the band, and is adapted to ride in a slot 99, cut through the cylindrical wall forming the aperture 98. When assembled, an extended needle structure 74 of the implanter 70, slip fits through the aligned conduits 94 and 97, and its band 71 slip fits within the cylindrical sleeve defined by the aperture 98 of the adapter 96. As indicated by the showing in FIG. 3, the extended or sharpened end of needle 74, remains just within the opening 93, when the pin 73 contacts the far end of slot 99. Moreover, the forward longitudinal displacement of the structure 70 relative to housing 90 is limited to the total length of the slot 99. It is evident therefore that by means of this arrangement, the length of needle received within cavity 92, and available for entry into the fish, is predetermined by the length of the slot provided in the adapter element 96.

Tagging fish using the instrument according to the invention as shown in FIG. 3, requires that the fish be held securely in one hand, to position its head within the conforming contour of the housing cavity 92, such that an area on the forward portion of the head is placed against needle conduit opening 93. Implanter 70, which is essentially a device in the nature of that disclosed in the aforementioned patents to Hickey and White, is additionally equipped with a handle 75 to be gripped by a free hand, or secured in a vise. Thus, the point of needle 74, preloaded with a tag can be conveniently manipulated to be forced through the skin of the fish and stopped at a point preset by the length of slot 99. Immediately thereafter the plunger within the needle 74 would be actuated by an inward depression of its thumb button 76, whereby the tag is pushed into the fish at the preset point. Upon release of the plunger, the operation is reversed such that the button 76 is retracted with the plunger, and the needle is separated from the fish and consequently retracted back to bring its point into the opening 93. Accordingly, the instrument of FIG. 3 constitutes a practical and safe means to insure that the tag implanted thereby is securely retained at very nearly the same area of each fish so processed.

While a preferred form and embodiment of the invention has been illustrated and described herein, it is to be understood that the invention is not limited thereby, but is susceptible to changes in form and detail.

What is claimed is:

1. An instrument to implant a tag at a designated location in a macro-organism, comprising an injector device having elongated means displaceable in a longitudinal path to pierce and enter the body substance of the macroorganism and eject a tag so as to lodge said tag in said body substance close by said means, a guiding enclosure constituted by a hood-like housing having an opening therein, spread across two angularly disposed sides thereof, constituting an entrance to a reltively large cavity in said housing, said cavity being internally contoured to receive and maintain closely fitted therein a substantial portion of said body substance in a position whereby said designated location is in the longitudinal path of said means to pierce and enter, and further means fixed to said enclosure and slidably connected to said injector device adapting said device to be operative with respect to said enclosure, said further means comprising a connector element having a part defining a hollow passage opened at one end and communicating with said enclosure cavity through a conduit in said connector element which extends between said cavity and another end of said passage, and said injector device further having fixed thereto a bearing band encircling said means to pierce and enter, a slot in said connector element opening into said passage, a pin projecting from said bearing band which is disposed to slide in said slot when said bearing band is arranged to slide within said passage whereby said means to pierce and enter is disposed to slide in said conduit for displacement in said enclosure cavity.

2. The instrument of claim 1 wherein said enclosure housing is an integral element of transparent material.

References Cited by the Examiner

UNITED STATES PATENTS 2,907,327   10/1959   White _____ 128—217

RICHARD A. GAUDET, *Primary Examiner.*

G. McNEILL, *Assistant Examiner.*